(12) United States Patent
Damon et al.

(10) Patent No.: US 8,909,468 B2
(45) Date of Patent: Dec. 9, 2014

(54) ROUTE PORTALS

(75) Inventors: Todd E. Damon, Phoenix, AZ (US);
Mathew Cucuzella, Phoenix, AZ (US)

(73) Assignee: General Motors LLC, Detroit, MI (US)

( * ) Notice: Subject to any disclaimer, the term of this patent is extended or adjusted under 35 U.S.C. 154(b) by 172 days.

(21) Appl. No.: 13/154,595

(22) Filed: Jun. 7, 2011

(65) Prior Publication Data

US 2012/0316771 A1  Dec. 13, 2012

(51) Int. Cl.
*G01C 21/00* (2006.01)
*G01C 21/36* (2006.01)

(52) U.S. Cl.
CPC .................................. *G01C 21/3626* (2013.01)
USPC .......................................... 701/412; 701/442

(58) Field of Classification Search
USPC .......................... 701/412, 417, 442, 446, 456
See application file for complete search history.

(56) References Cited

U.S. PATENT DOCUMENTS

| | | | |
|---|---|---|---|
| 5,475,599 A * | 12/1995 | Yokoyama et al. | 701/428 |
| 6,199,001 B1 * | 3/2001 | Ohta et al. | 701/51 |
| 6,400,690 B1 * | 6/2002 | Liu et al. | 370/252 |
| 6,411,894 B2 * | 6/2002 | Yamamoto et al. | 701/409 |
| 8,150,406 B1 * | 4/2012 | Crandall et al. | 455/452.2 |
| 2002/0169545 A1 * | 11/2002 | Toyooka | 701/207 |
| 2007/0037610 A1 * | 2/2007 | Logan | 455/574 |
| 2008/0167810 A1 * | 7/2008 | Wildervanck | 701/211 |
| 2008/0284648 A1 * | 11/2008 | Takada et al. | 342/357.09 |
| 2009/0171569 A1 * | 7/2009 | Nishida | 701/207 |
| 2009/0181695 A1 * | 7/2009 | Wirola et al. | 455/456.1 |
| 2012/0303262 A1 * | 11/2012 | Alam et al. | 701/410 |
| 2013/0314281 A1 * | 11/2013 | Percy et al. | 342/450 |

* cited by examiner

*Primary Examiner* — Khoi Tran
*Assistant Examiner* — Ryan Rink
(74) *Attorney, Agent, or Firm* — Leydig, Voit & Mayer, Ltd.

(57) ABSTRACT

The described method and system provide for utilizing portals during GPS navigation to avoid unnecessary off-route notifications and route recalculation in problem areas. The method and system are described in the context of a GPS unit that is part of a telematics unit in a vehicle. If the route calculated by the GPS unit includes certain problem areas such as tunnels and stacked bridges, the GPS unit may utilize portals to process GPS navigation through those areas. When a user enters a portal, normal GPS navigation is suspended and certain features are disabled. For example, the user will not longer receive Turn-by-Turn (TBT) directions, off-route notifications, error notifications, and route recalculation notifications, until the GPS unit determines that the user has arrived at a second portal or until the user manually re-enables those features. The portals should be preferably located at the inlets and outlets to the problem areas. Thus, while the user is in a problem area, errant GPS information may be discarded or ignored, and the provision of unnecessary off-route notifications and route recalculations to the user may be avoided.

7 Claims, 4 Drawing Sheets

ROUTE PORTALS

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

One of the services conventionally provided by TSPs is GPS navigation, which may include the provision of Turn-by-Turn (TBT) directions. To use GPS navigation, a user of the telematics unit may enter a destination, and the GPS component of the telematics unit may provide directions (e.g. through a display and/or through vocal instructions) to the user based on a calculated course from the user's current location to the user's destination. When a user does not follow the directions and goes off-course (i.e., when the position of the vehicle is not on the calculated course), the GPS unit may recalculate a new course for the user to take based on the vehicle's position when it goes off-course.

While this is often a helpful feature for users who accidentally take a wrong turn, miss a turn, or encounter some unanticipated obstacle (e.g. road closures), off-route notifications and course recalculation is often a source of annoyance for users when they occur while the user is actually on-route. For example, if the calculated route takes the user through a tunnel or a stacked bridge (or other type of areas where GPS navigation is prone to error), GPS positioning information may be lost or erroneous while the user is in the tunnel or stacked bridge, causing the GPS unit to present off-route notifications and route recalculation when not necessary. Such areas, including but not limited to stacked bridges, tunnels, etc., will hereinafter be referred to as "problem areas" for convenience.

Thus, it is an object in part to provide a system and method for processing GPS navigation such that traveling through areas such as tunnels and stacked bridges do not trigger off-route notifications. However, while this is an object underlying certain implementations of the invention, it will be appreciated that the invention is not limited to systems that solve the problems noted herein. Moreover, the inventors have created the above body of information merely for the convenience of the reader; the foregoing is a discussion of problems discovered and/or appreciated by the inventors, and is not an attempt to review or catalog the prior art.

BRIEF SUMMARY OF THE INVENTION

The invention provides a system and method for utilizing portals during GPS navigation to avoid unnecessary off-route notifications and route recalculation in problem areas. In one implementation, a method for GPS navigation is provided on a GPS device, the method comprising: receiving, at the GPS device, input from a user corresponding to an intended destination; calculating a route from a starting point to the intended destination; determining that the user has entered a geographic region designated as a first portal; and disabling provision of certain types of notifications to the user until a predetermined condition occurs. The predetermined condition may be the user entering a region designated as a second portal, which may be associated with the first portal in a database for storing portal information, or the predetermined condition may be receiving an input from the user to enable the types of notifications that were previously disabled. The notifications that may be disabled and re-enabled include Turn-by-Turn (TBT) directions, off-route notifications, error notifications, and route recalculation notifications.

After the user has entered the first portal, GPS position information corresponding to the current position of the user may be discarded, and errors related to poor GPS signal reception may be ignored, until a predetermined condition has been met (e.g. the GPS unit determines that the user has reached a second portal or the user manually enables normal GPS navigation). The portals may be defined by a set of GPS coordinates, and the size of the portals may depend on the accuracy of the GPS system as well as map features within the vicinity of the portals. Determination of whether a user has entered a portal may be performed by comparing the user's current location to sets of GPS coordinates defining portals.

The inventive principles described herein may also be implemented as computer executable instructions on a tangible, non-transient computer-readable medium in a GPS system. In preferred implementations, the system and method are implemented within the context of a GPS unit that is part of a telematics unit in a vehicle.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for utilizing portals during GPS navigation to avoid unnecessary off-route notifications and route recalculation in problem areas. In certain preferred implementations, the GPS navigation may be performed by a GPS unit that is part of a telematics system on a vehicle.

Figure 1:
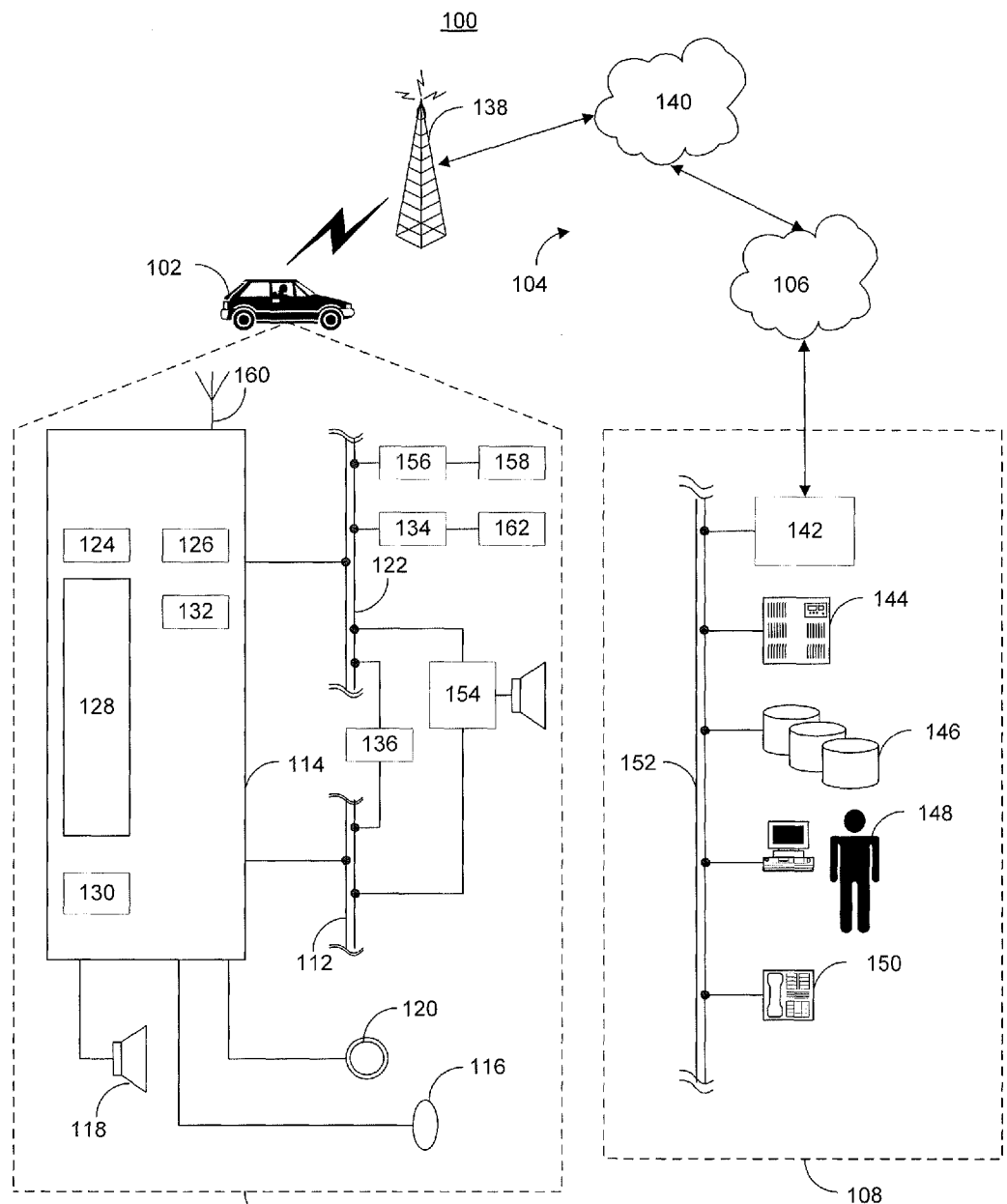
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

GPS navigation services may be implemented based on the geographic position information of the vehicle provided by the GPS based chipset/component 132. A user of the telematics unit may enter a destination using inputs corresponding to the GPS component, and a route to a destination may be calculated based on the destination address and a current position of the vehicle determined at approximately the time of route calculation. Turn-by-turn (TBT) directions may further be provided on a display screen corresponding to the GPS component and/or through vocal directions provided through a vehicle audio component 154. It will be appreciated that the calculation-related processing may occur at the telematics unit or may occur at a call center 108. It will be appreciated that TBT directions is merely a type of GPS navigation, and because the principles described herein are applicable to GPS navigation, they are equally applicable to GPS navigation through TBT directions. It will also be appreciated that the processing associated with GPS navigation/TBT directions may be carried out at a vehicle through a telematics unit, at a TSP call center, or both (e.g. the intelligence for route calculation may be implemented locally at the GPS unit of the vehicle, or may be implemented at the call center and provided wirelessly to the vehicle).

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
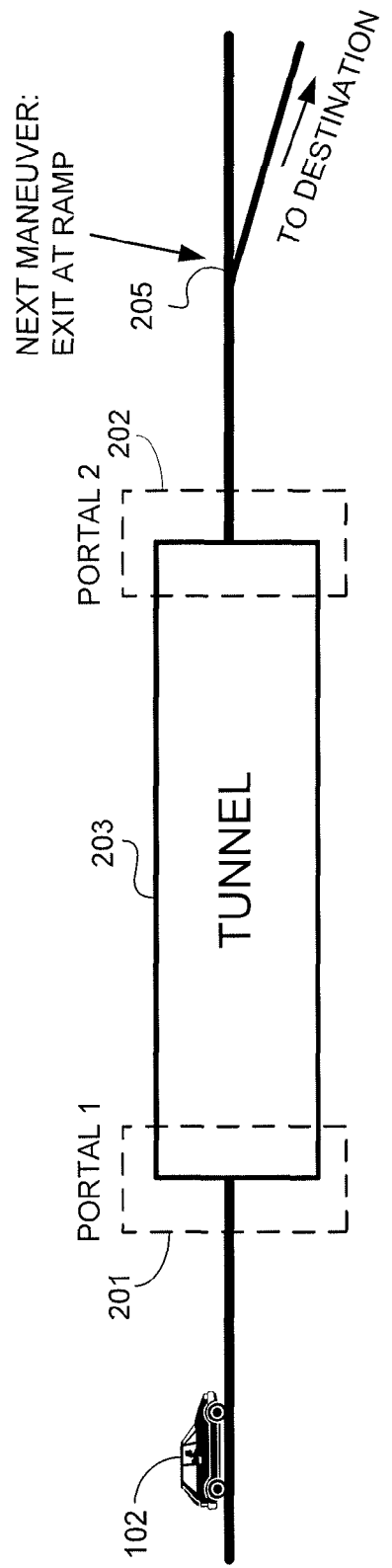
FIG. 2 is a diagram illustrating the designation of portals on an exemplary map in accordance with an implementation of the described principles.
Figure 3:
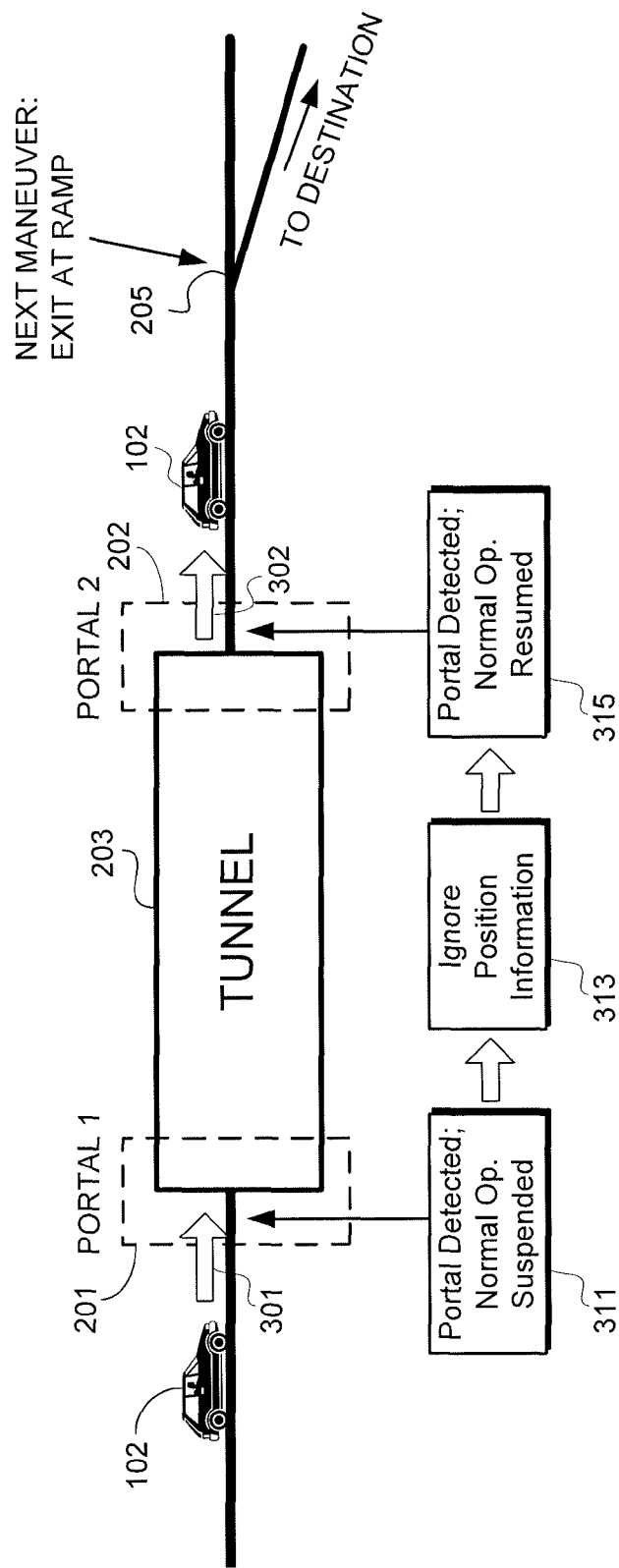
FIG. 3 is a diagram combined with a flowchart illustrating a process for GPS navigation utilizing portals in accordance with an implementation of the described principles.
Figure 4:
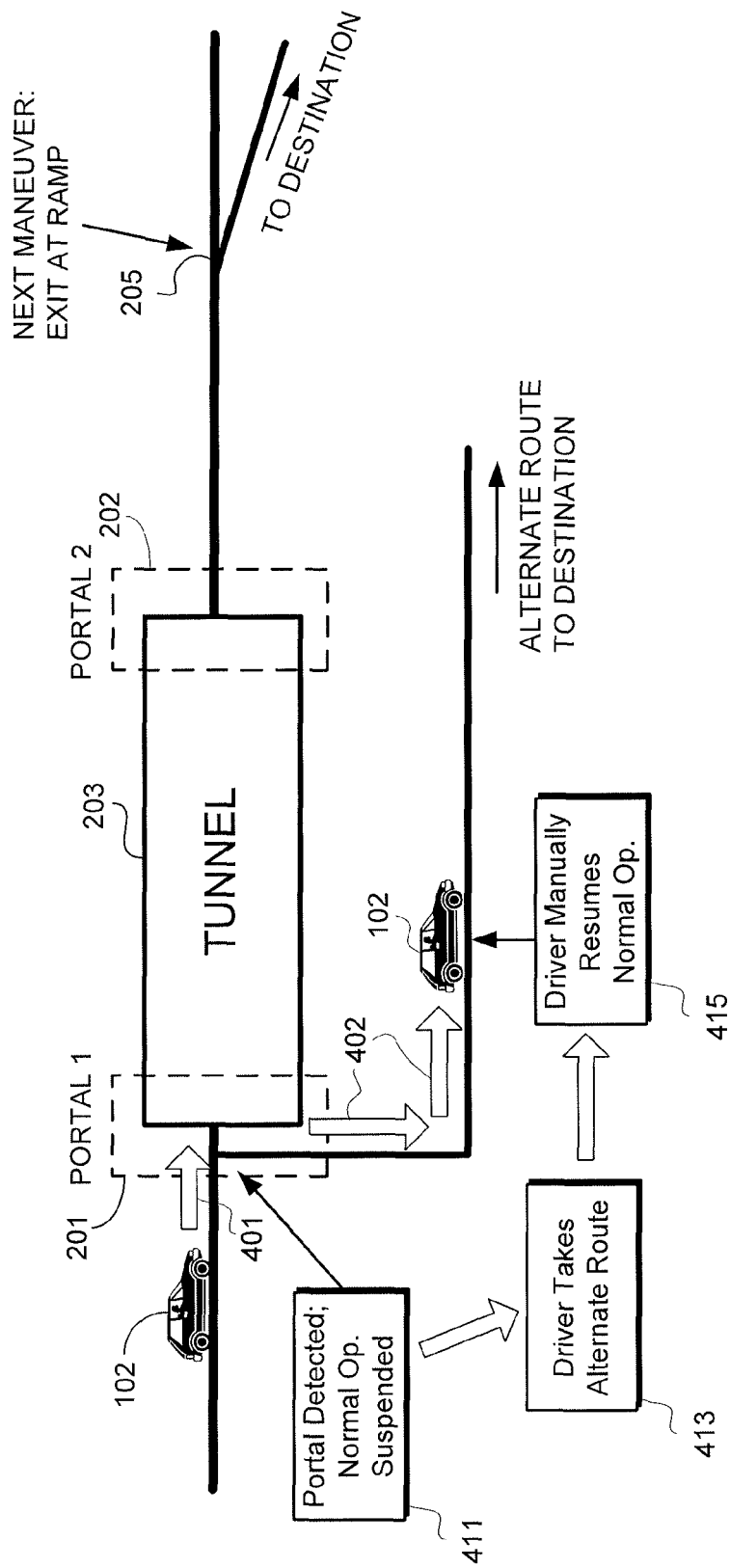
FIG. 4 is another diagram combined with a flowchart illustrating a process for GPS navigation utilizing portals in accordance with an implementation of the described principles.

With further reference to the architecture of FIG. 1, and turning more specifically to FIG. 2, a diagram 200 is depicted illustrating the designation of two portals, portal 1 (201) and portal 2 (202) on a simplified exemplary map. In this example, a vehicle 102 is currently headed towards an intended destination entered into the GPS unit by the user. The calculated route provided to the user informs the user that the next maneuver (i.e., the next "turn" in the provision of TBT directions) is to exit at a ramp 205. The calculated route takes the vehicle 102 through a tunnel 203. Although a tunnel is depicted in FIGS. 2-4, it will be appreciated that the principles described with respect to FIGS. 2-4 are applicable to portals used in conjunction with any other types of problem areas as well.

In a conventional system, when the user passes through tunnel 203, GPS positioning information of the vehicle 102 may be lost or may become erroneous due to the tunnel's 203 interference with GPS signals. Thus, the GPS system may determine that the user is going "off-route" and may inform the user that it is going off-route and attempt to recalculate a route to the destination, or the GPS system may indicate to the user that positioning information is lost and display an error indication to the user. However, these unnecessary off-route notifications and route recalculations are avoided according to implementations of the present invention.

In FIG. 2, the area surrounding around the entrance of the tunnel 203 has been designated as a portal 201 (i.e. Portal 1), and the area surrounding the exit of the tunnel has also been designated as a portal 202 (i.e. Portal 2). It will be appreciated that, in general, portals should preferably be located at the inlets/outlets of problem areas. GPS navigation utilizing portals 201 and 202 according to this implementation is discussed below with respect to FIG. 3.

It will be appreciated that portal designations may be stored in a database at a call center or at a GPS unit, and that it may be stored together with map information used for route calculation or may be stored separately. For example, in one implementation, when the GPS unit or call center calculates a route, portals may be designated with the map information as part of the route. In another implementation, the portal designations may be stored separately, such that when a user enters an area designated as a portal, the processes described below with respect to GPS navigation through portals are implemented by the GPS unit without having the map information or route calculation itself contain portal designations embedded in them.

With further reference to the architecture of FIG. 1 and the exemplary map of FIG. 2, a process 300 for GPS navigation and TBT directions through tunnel 203 using portals 201 and 202 is depicted by FIG. 3. As shown in FIG. 3, when the vehicle 102 enters 301 the geographic region designated as Portal 1 (201), "normal" operation of the GPS unit may be suspended. For example, certain features of GPS navigation that normally would be provided to the vehicle 102 may be disabled, including but not limited to audio and displayed updates to TBT directions, error notifications based on an incapability to receive GPS signals (due to inadequate reception or for other reasons such as signal interference), off-route notifications, and route recalculation. Instead, the GPS unit and/or TBT directions may simply continue to indicate that the next maneuver is to exit at ramp 205, providing the same information as before the vehicle 102 entered Portal 1 (201). In an alternative implementation, the GPS unit and/or TBT directions may provide a special indication to the user that certain GPS services are suspended because the vehicle 102 is in a problem area such as a tunnel or stacked bridge.

It will be appreciated that the size of Portal 1 (201) may be adjusted based on the accuracy of the GPS positioning system to ensure that GPS units on vehicles entering the tunnel 203 through the entrance at Portal 1 (201) will be able to determine that the vehicles have entered a portal. The size of Portal 1 (201) may further be adjusted to account for any map-related features in the vicinity of the tunnel entrance. For example, if there is an intersection near the tunnel 203 around the area of Portal 1 (201), not all users entering that area will necessarily go into the tunnel 203, so suspending normal operation based on entering that area would not always be beneficial. Thus, the size of the portal may be adjusted to avoid such problems.

After the GPS unit determines that the vehicle has entered the portal 311, normal operation of the GPS unit is suspended and, while the vehicle is in the tunnel 203, position information corresponding to the vehicle 102 (or error notifications due to a lack of GPS position signals, for example, due to poor reception of GPS position signals) may be ignored or discarded until a condition is met for resuming normal operation. In the implementation depicted by FIG. 3, the condition is the vehicle 102 emerging 302 from Portal 2 (202) on the other side of the tunnel 203. When the GPS unit detects that the current position of vehicle 102 is within a second portal (Portal 2 (202)), the GPS unit stops discarding or ignoring position information corresponding to the vehicle 102 and resumes normal operation 315.

It will be appreciated that the portals may be defined by a set of GPS coordinates, and determining when a portal has been entered may be performed by comparing the GPS position information corresponding to a user's current location to the set of GPS coordinates defining the portal. In a further implementation, portals may be uniquely associated with each other. For example, because portal 1 and portal 2 are located at the two ends of tunnel 203, the GPS unit may be configured such that, after the vehicle 102 enters portal 1, the GPS unit will only resume normal operation when detecting that the vehicle has left the tunnel 203 through portal 2 (or has re-emerged from the tunnel 203 through portal 1 after some period of time).

In some instances, a vehicle may enter a portal corresponding to a problem area such as a tunnel but end up leaving the portal area without actually going into the problem area. This situation is illustrated in the implementation depicted by FIG. 4, which shows a diagram and flowchart 400 providing an alternative method of resuming normal operation after entering a portal. In FIG. 4, vehicle 102 enters 401 Portal 1 (201), but for some reason (e.g. the tunnel 203 is closed), the driver decides to taken an alternate route 402 (413). In this case, because the vehicle had entered a geographic region corresponding to Portal 1 (201), normal GPS navigation was suspended 411 as described above with respect to FIG. 3, but the vehicle 102 is not in the problem area (tunnel 203) and might not pass through Portal 2 (202) on its way to the destination. Thus, an option is given to the driver to manually resume normal operation as another condition for resuming normal operation, and if the driver provides an input 415 indicating that normal operation should be resumed after passing through a first portal, the GPS unit may then begin providing TBT notifications, error notifications, off-route notifications, and route recalculation as usual.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center. It will further be appreciated that, although the above implementations have been described in the context of a telematics unit and vehicles, the principles described herein are not limited to telematics units or vehicles and may also be implemented on standalone GPS devices and other types of GPS navigation units (such as those provided on mobile phones).

It will thus be appreciated that the described system and method allows for utilizing portals during GPS navigation to avoid unnecessary off-route notifications and route recalculation in problem areas. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for Global Positioning System (GPS) navigation on a GPS device having a processor, comprising:

receiving, at the GPS device, input from a user corresponding to an intended destination;

calculating, via the processor, a route from a starting point to the intended destination, wherein the route includes: a problematic geographic region for GPS navigation at an intermediate stage of the route, a defined entry portal corresponding to the problematic geographic region, and a defined exit portal corresponding to the problematic geographic region;

determining, by the processor, that the GPS device has entered the defined entry portal;

suspending, by the processor, route recalculation processing and processing of GPS signal reception errors in response to determining that the GPS device has entered the defined entry portal;

determining, by the processor, that the GPS device has entered the defined exit portal; and resuming, by the processor, route recalculation processing and processing of GPS signal reception-related errors in response to determining that the GPS device has entered the defined exit portal;

wherein the defined entry portal and the defined exit portal each include an area outside of the problematic geographic region.

2. The method of claim 1, wherein the defined entry portal is defined by a set of GPS coordinates.

3. The method of claim 1, wherein the size of the defined entry portal depends on at least one of: the accuracy of the GPS device and map features within the vicinity of an entrance to the problematic geographic region.

4. The method of claim 1, wherein the starting point is a current position of the GPS device determined at approximately the time of route calculation.

5. The method of claim 1, wherein the GPS device is a hardware component within a vehicle.

6. A device for Global Positioning System (GPS) navigation, comprising a processor and a non-transitory computer-readable medium having stored thereon computer executable instructions, the computer executable instructions facilitating:

calculating a route from a starting point to an intended destination based on a received input from a user corresponding to an intended destination, wherein the route includes: a problematic geographic region for GPS navigation at an intermediate stage of the route, a defined entry portal corresponding to the problematic geographic region, and a defined exit portal corresponding to the problematic geographic region;

determining that the device has entered the defined entry portal;

suspending route recalculation processing and processing of GPS signal reception errors in response to determining that the device has entered the defined entry portal;

determining that the device has entered the defined exit portal; and resuming route recalculation processing and processing of GPS signal reception-related errors in response to determining that the device has entered the defined exit portal;

wherein the defined entry portal and the defined exit portal each include an area outside of the problematic geographic region.

7. The device of claim 6, wherein the device is part of a telematics unit in a vehicle.

* * * * *